(12) United States Patent
Furukawa et al.

(10) Patent No.: US 7,039,077 B2
(45) Date of Patent: May 2, 2006

(54) OPTICAL WAVELENGTH CONVERTING APPARATUS, AND OPTICAL WAVELENGTH CONVERTING METHOD

(75) Inventors: Yukio Furukawa, Kanagawa (JP); Hajime Sakata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 10/620,419

(22) Filed: Jul. 17, 2003

(65) Prior Publication Data

US 2004/0027648 A1 Feb. 12, 2004

(30) Foreign Application Priority Data

Jul. 23, 2002 (JP) ............................. 2002-213355
Jul. 10, 2003 (JP) ............................. 2003-272948

(51) Int. Cl.
*H01S 3/10* (2006.01)
(52) U.S. Cl. .......................................... 372/21; 372/22
(58) Field of Classification Search .................. 372/25, 372/18, 22, 20
See application file for complete search history.

(56) References Cited

U.S. PATENT DOCUMENTS

| | | | |
|---|---|---|---|
| 3,735,280 A * | 5/1973 | Johnston, Jr. ................ 372/53 |
| 5,048,030 A * | 9/1991 | Hiiro ............................ 372/68 |
| 5,130,844 A | 7/1992 | Okazaki |
| 5,274,651 A * | 12/1993 | Urakami ...................... 372/21 |
| 5,349,598 A | 9/1994 | Ouchi et al. |
| 5,436,920 A * | 7/1995 | Minemoto et al. ............ 372/21 |
| 5,450,429 A * | 9/1995 | Klemer et al. ................ 372/22 |
| 5,526,176 A | 6/1996 | Furukawa |
| 5,809,048 A * | 9/1998 | Shichijyo et al. ............. 372/32 |
| 6,154,302 A | 11/2000 | Yagi et al. |
| 6,816,519 B1 * | 11/2004 | Momiuchi et al. ............ 372/21 |
| 2001/0038737 A1 | 11/2001 | Imada et al. |

* cited by examiner

*Primary Examiner*—Minsun Oh Harvey
*Assistant Examiner*—Tuan N. Nguyen
(74) *Attorney, Agent, or Firm*—Fitzpatrick, Cella, Harper & Scinto

(57) ABSTRACT

An optical wavelength converting apparatus includes a first semiconductor laser, a second semiconductor laser, and a wavelength converting element for converting first and second laser light from the first and second semiconductor lasers to sum frequency light. In this apparatus, the first semiconductor laser and the wavelength converting element are arranged so as to establish an external resonator structure in which the first laser light can be put under a resonant condition, and an optical path of the second laser light is so determined that the second laser light can propagate through the wavelength converting element.

10 Claims, 13 Drawing Sheets

OPTICAL WAVELENGTH CONVERTING APPARATUS, AND OPTICAL WAVELENGTH CONVERTING METHOD

BACKGROUND OF THE INVENTION

1. Field of the Invention

The present invention relates to an optical wavelength converting apparatus and an optical wavelength converting method for effecting wavelength conversion by sum-frequency mixing light from a semiconductor laser diode (LD) and light from another LD. Particularly, the present invention relates to an optical wavelength converting apparatus for emitting laser light, which is capable of high-speed modulation driving, and can be used as light sources in picture display apparatuses, such as laser displays, light sources for optical recording, light sources for optical measurement, etc., more specifically, light sources in electrophotographic image forming apparatuses, light sources for writing or reading record media, and light sources for communications.

2. Description of the Related Background Art

A so-called sum frequency generating method will be described with reference to FIG. 22. FIG. 22 illustrates an optical wavelength converting apparatus for generating sum frequency light as disclosed in U.S. Pat. No. 5,130,844.

In the case of the sum frequency generating method in which two LD light at wavelengths $\lambda_1$ and $\lambda_2$ is introduced into nonlinear optical material to generate light at a wavelength $\lambda_3$ whose frequency is the sum of frequencies of light at wavelengths $\lambda_1$ and $\lambda_2$, a selective range of usable LDs can be widened, as compared with the second-harmonic generation (SHG) method in which light at a wavelengths $\lambda_3$ is generated using LD light at a wavelength $2\lambda_3$. In FIG. 22, reference numerals 10 and 30 denote laser beams. Reference numerals 11 and 31 denote LDs. Reference numerals 11a and 31a denote end faces of the LDs. Reference numerals 12, 32 and 36 denote rod lenses serving as collimator lenses. Reference numeral 13 denotes a polarization beam splitter. Reference numeral 14 denotes an optical wavelength converting element. Reference numeral 15' denotes a mirror. Reference numeral 15a' denotes an end surface of the mirror. Reference numeral 16 denotes a stopper for absorbing light. Reference numeral 20 denotes a reflection grating. Reference numeral 21 denotes a rotational axis. Reference numeral 33 denotes a half mirror. Reference numeral 35 denotes sum frequency light.

The laser beam 10 at the wavelength $\lambda_1$ is confined between the end face 11a of the LD 11 and the end surface 15a' of the mirror 15', and laser-oscillated. The laser beam 30 at the wavelength $\lambda_2$ is also confined between the end surface 15a' of the mirror 15' and the reflection grating 20, and likewise laser-oscillated. There is provided on the end surface 15a' of the mirror 15' a coating for reflecting approximately 100% of laser beams 10 and 30 at the wavelengths $\lambda_1$ and $\lambda_2$ while transmitting therethrough approximately 100% of the sum frequency light 35 at the wavelengths $\lambda_3$. In this structure, both the LDs 11 and 31 have external resonator structures. Accordingly, power density of light in the optical wavelength converting element 14 is higher than a case where no external resonator is provided. High conversion efficiency can hence be obtained. As mentioned above, this optical wavelength converting apparatus includes two external resonator structures.

In the optical wavelength converting apparatus as discussed above, however, the physical length of the laser resonator increases since there are provided two external resonator structures. Further, it is quite difficult to phase-match longitudinal modes of those two resonators with the sum frequency light in the wavelength converting element. Therefore, the conversion efficiency of the sum frequency light is liable to easily fluctuate, and its output is likely to be unstable. Thus, the above structure is not suitable for high-speed modulation.

SUMMARY OF THE INVENTION

It is an object of the present invention to provide an optical wavelength converting apparatus and an optical wavelength converting method, which can have high conversion efficiencies and are capable of high-speed modulation.

According to one aspect of the present invention, there is provided an optical wavelength converting apparatus which includes a first semiconductor laser, a second semiconductor laser, and a wavelength converting element for converting first and second laser lights from the first and second semiconductor lasers to sum-frequency light. In this apparatus, there is provided an external resonator structure in which the first semiconductor laser and the wavelength converting element are arranged such that the first laser light can be put under a resonant condition, and an optical path of the second laser light is so determined that the second laser light can propagate through the wavelength converting element. More specifically, reflectances of plural reflective surfaces contained in the external resonator are determined such that the second laser light cannot resonate in the external resonator.

According to another aspect of the present invention, there is provided an optical wavelength converting method in which first laser light from a first semiconductor laser and second laser light from a second semiconductor laser are permitted to enter a wavelength converting element for converting the first and second laser lights to sum-frequency light. In this method, the first semiconductor laser and the wavelength converting element are arranged so as to establish an external resonator structure in which the first laser light can be put under a resonant condition, and the optical path of the second laser light is so determined that the second laser light can propagate through the wavelength converting element.

DESCRIPTION OF THE PREFERRED EMBODIMENTS

A first embodiment of the present invention will be described. An optical wavelength converting apparatus of the first embodiment is directed to an apparatus in which a first semiconductor laser, a wavelength converting element, and a pair of mirrors constitute an external resonator structure, and a second semiconductor laser is so arranged that laser light from the second semiconductor laser can propagate through the wavelength converting element. In this specification, the semiconductor laser is a laser that includes a semiconductor active layer.

Figure 1:
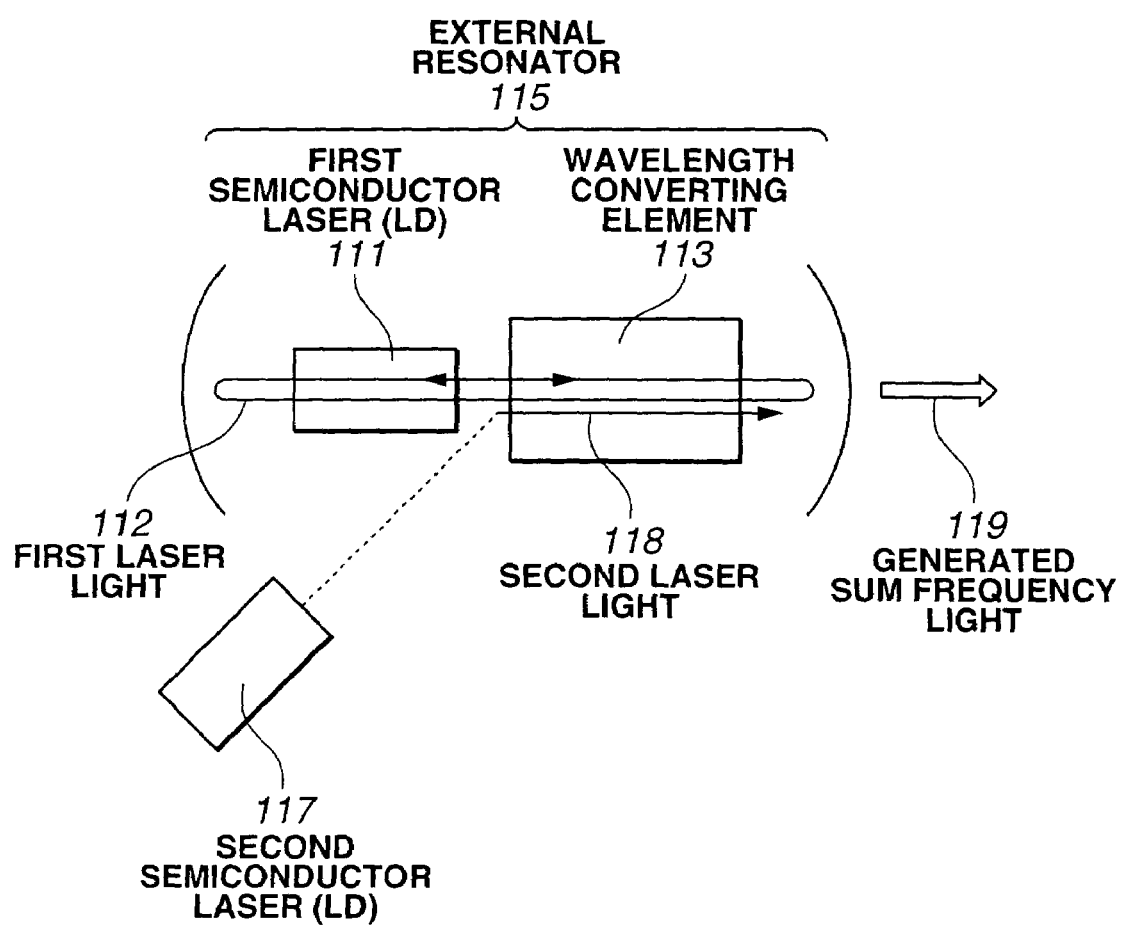
FIG. 1 is a schematic view illustrating an embodiment of an optical wavelength converting apparatus according to the present invention.

FIG. 1 is a schematic view illustrating the optical wavelength converting apparatus of the first embodiment. In FIG. 1, there are arranged a first semiconductor laser (LD) 111, a second semiconductor laser (LD) 112, and a wavelength converting element 113 (for example, a KTP crystal of nonlinear optical material). An external resonator 115 is constructed by the first LD 111, the wavelength converting element 113, and a pair of reflective surfaces (not shown). In the external resonator 115, the first LD 111 is disposed such that first laser light 112 emitted by the first LD 111 can reciprocate between a pair of reflective surfaces, and can be put under a resonant condition.

The second LD 117 is disposed outside the external resonator 115. Second laser light 118 emitted by the second LD 117 is guided into the wavelength converting element 113 to generate sum frequency light 119. In the first embodiment, the second laser light 118 emitted by the second LD 117 is introduced into the wavelength converting element 113 through a place between the first LD 111 and the wavelength converting element 113. Further, the wavelength converting element 113 is made of a nonlinear optical material which is cut so as to have such a predetermined crystal angle that the angular phase matching condition can be satisfied between the two laser light 112 and 118 and the sum frequency light 119.

In the optical wavelength converting apparatus of the first embodiment having such an external resonator structure, the power density of the first laser light 112 in the wavelength converting element 113 can be increased several times to several tens times, as compared with an apparatus lacking the resonator, though it depends on the reflectance of the resonator mirror. The wavelength conversion efficiency in the case of sum frequency light generation is proportional to the product of power densities of two input light, and hence the wavelength conversion efficiency can be enhanced by adopting the resonator structure.

Further, in the optical wavelength converting apparatus of the first embodiment, only one external resonator is provided, and the other semiconductor laser does not constitute an external resonator structure. Input light from the other semiconductor laser (the second semiconductor laser) is modulated by modulating its driving current. The sum frequency mixing is performed between light from that modulated semiconductor laser and light from the semiconductor laser constituting the external resonator.

The light power density of the semiconductor laser constituting the external resonator is drastically high, and at the same time its line width is narrow. In such a structure, the sum frequency light can be generated using light at two wavelengths from the two semiconductor lasers even if precise phase matching is not established between these lights. Further, the semiconductor laser (i.e., the second semiconductor laser) which is to be inserted does not constitute the external resonator. Therefore, when the second LD 117 is modulated, the sum frequency light 119 can be modulated with almost no delay in accordance with the control pattern of modulated current injected into the second LD 117.

In contrast to the above, simultaneous resonance of two input light is very disadvantageous in the following points: (1) Highly precise control of the external resonator and temperature control are required to achieve the phase matching between the two resonator longitudinal modes and the sum frequency light in the nonlinear optical material. Particularly, in an element in which a periodically domain-inverted structure is formed in the nonlinear optical material to achieve quasi-phase matching, it is very difficult to satisfy a condition for newly generating the sum frequency light when both input lights are made in the resonator. (2) Even modulation of one external resonator laser leads to fluctuation in its oscillation spectrum, and time delay in response for establishment of the resonator mode. Accordingly, the conversion efficiency varies, and the modulation speed decreases.

The first embodiment is constructed such that the laser light 118 from the second LD 117 transmits through the wavelength converting element 113 only once, but this laser light can be non-resonant light that reciprocates in the wavelength converting element.

In the thus-fabricated first embodiment, when wavelengths of the first and second LDs 111 and 117 are set at 808 nm and 1550 nm, respectively, the sum frequency light at the wavelength of 531 nm (i.e., 1/531=1/808+1/1550) can be obtained. Further, when current injected into the second LD 117 is modulated at the modulation frequency of 500 MHz in a square-wave manner, intensity modulation of the sum frequency light 119 can be obtained following this current modulation. In this embodiment, a DFB (distributed feedback) LD with a small wavelength fluctuation at the time of modulation is used as the second LD 117. Further, one of a pair of reflective surfaces constituting the external resonator is a mirror disposed on an end face of the first semiconductor laser 111 opposite to its light emitting end face, and the other reflective surface is a mirror disposed on an end face of the wavelength converting element 113 on the side from which light transmitting through the wavelength converting element returns.

Semiconductor lasers usable in the first embodiment are as follows: Where green light (its wavelength approximately ranges from 510 nm to 560 nm) is to be obtained, it is preferable to select as the first semiconductor laser 111 a semiconductor laser oscillating at the wavelength from 760 nm to 880 nm, and select as the second semiconductor laser 117 a semiconductor laser oscillating at the wavelength from 1480 nm to 1650 nm. Where yellow to orange light (its wavelength approximately ranges from 570 nm to 600 nm) is to be obtained, it is preferable to select as the first semiconductor laser 111 a semiconductor laser oscillating at the wavelength from 980 nm to 1080 nm, and select as the second semiconductor laser 117 a semiconductor laser oscillating at the wavelength from 1300 nm to 1400 nm. It is likewise possible to achieve the above object by combinations of semiconductor lasers whose optical frequencies $\omega_1$ and $\omega_2$ satisfy $\omega_3=\omega_1+\omega_2$ where $\omega_3$ is the frequency that is desired to be obtained by the sum frequency mixing.

As semiconductor lasers preferably usable in the first embodiment, there also exist a Fabry-Perot laser using a cut face or an etched face of a semiconductor laser substrate, a DBR (Distributed Bragg Reflector) laser, a DFB laser, a surface emitting laser having a resonator or cavity formed perpendicularly to its substrate, etc. Further, it is preferable to use a laser chip whose end face opposite to its light emitting end face is made a highly reflective coating face, a laser whose light emitting end face is made an antireflective or low reflective coating face, a can-packaged laser, or a laser having a quantum well structure. Particularly, a can-packaged laser can be used as the second semiconductor laser.

Longitudinal mode intervals of the first semiconductor laser usable in the first embodiment are short when the length of the external resonator is long, and long when the length of the external resonator is short. Here, it is necessary to design the length of the external resonator considering the line width of the semiconductor laser such that the phase matching wavelength tolerance width of the second semiconductor laser can be superimposed on the longitudinal mode wavelengths of the external resonator. The second semiconductor laser used in the first embodiment can be modulated by not only square-wave pulses but also any modulation signal such as a sinusoidal-wave signal, a triangular-wave signal, and a sawtooth-wave signal.

In the first embodiment, the wavelength converting element can be preferably made of nonlinear optical material, more specifically, dielectric material oxide crystal such as KTiOPO$_4$ (KTP), LiNbO$_3$ (LN), KNbO$_3$ (KN), LiTaO$_3$ (LT), LiB$_3$O$_5$ (LBO), and β-BaB$_2$O$_2$ (BBO), organic nonlinear material such as 2-adamantylamino-5-nitropyridine (AANP), and 2-methyl-4-nitroaniline (MNA), and nonlinear glass material on whose surface polarization is formed by applying a strong electric field to glass. Further, a waveguide can be provided along a light propagation direction in the nonlinear optical material. A waveguide projecting from the nonlinear optical material (a ridge structure) can also be provided. The light power density can be increased by the waveguide.

Furthermore, a periodically domain-inverted structure for the quasi-phase matching can be provided in the nonlinear optical material constituting the wavelength converting element in the first embodiment. In this case, a propagation direction with a large nonlinear optical constant can be selected in the nonlinear optical material, and hence the conversion efficiency can be improved. Further, ranges of usable LDs and obtainable wavelengths of the sum frequency light can be flexibly widened since LDs in a wavelength range unusable in the angular phase matching method can be used in this case.

According to the first embodiment, an optical wavelength converting apparatus and an optical wavelength converting method which have high converting efficiencies and are capable of high-speed modulation can be provided. High conversion efficiency can be achieved in the resonator structure since the power density of one laser light can be increased in the nonlinear optical material. High-speed modulation can be achieved by direct modulation of the other laser light.

A second embodiment of the present invention will be described. An optical wavelength converting apparatus of the second embodiment is directed to an apparatus in which a wavelength converting element has a periodically domain-inverted structure. The second embodiment is the same as the first embodiment in other points.

Figure 2:
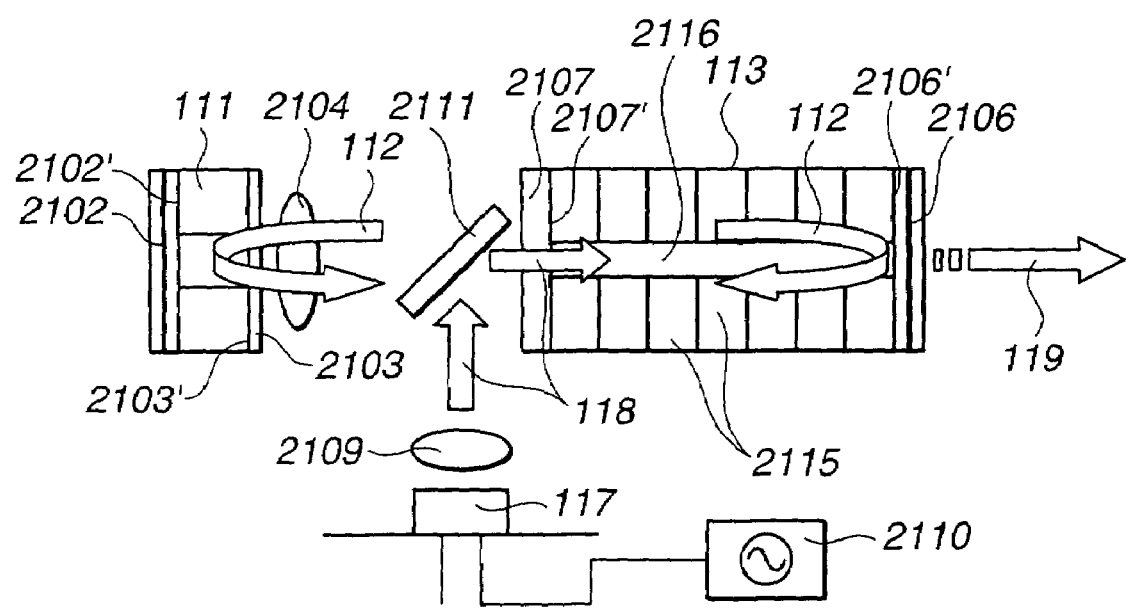
FIG. 2 is a schematic view illustrating another embodiment of an optical wavelength converting apparatus according to the present invention.

FIG. 2 illustrates the optical wavelength converting apparatus of the second embodiment. In FIG. 2, reference numeral 2115 represents a periodically domain-inverted structure. Reference numerals 2107 and 2103 represent dielectric multi-layers, respectively. Reference numerals 2102 and 2106 represent dielectric multi-layers acting as reflective surface mirrors, respectively. Reference numerals 2104 and 2109 represent condenser lenses, respectively. Reference numeral 2111 represents a beam splitter. Reference numeral 2110 represents a driving circuit for driving the second semiconductor laser 117.

Light from the first semiconductor laser 111 travels in a reciprocatory manner between the mirror 2102 formed on an end face 2102' of the first semiconductor laser 111 opposite to its light emitting end face 2103' and the mirror 2106 formed on an end face 2106' of the wavelength converting element 113 opposite to its light input side. The light from the first semiconductor laser 111 is thus put under its resonant condition. The light from the first semiconductor laser 111 transmits through the dielectric multi-layer 2103 disposed on the light emitting end face 2103' of the first semiconductor laser 111, is condensed by the condenser lens 2104, transmits through the beam splitter 2111, and enters the wavelength converting element 113 through the dielectric multi-layer 2107 formed on its end face 2107'. The dielectric multi-layers 2103 and 2107 are layers for preventing optical losses in the external resonator, which are provided according to necessities. The second semiconductor laser 117 is driven by the driving circuit 2110 in a modulation manner. Light from the second semiconductor laser 117 is condensed by the condenser lens 2109, is reflected by the beam splitter 2111, transmits through the dielectric multi-layer 2107, and enters the wavelength converting element 113.

Sum frequency light 119 obtained by the sum frequency mixing between laser lights 112 and 118 from the first and second semiconductor lasers 111 and 117 transmits through a waveguide 2116, and goes outside the optical wavelength converting apparatus through the wavelength converting element 113 and the dielectric multi-layer 2106. The power density of the laser light 112 from the first semiconductor laser 111 is increased under the resonant condition. The dielectric multi-layer 2106 is transmissive to the sum frequency light 119, and reflective to the first and second semiconductor laser light 112 and 118. The dielectric multi-layer 2107 is transmissive to the first and second semiconductor laser light 112 and 118, and reflective to the sum frequency light 119.

Figure 3:
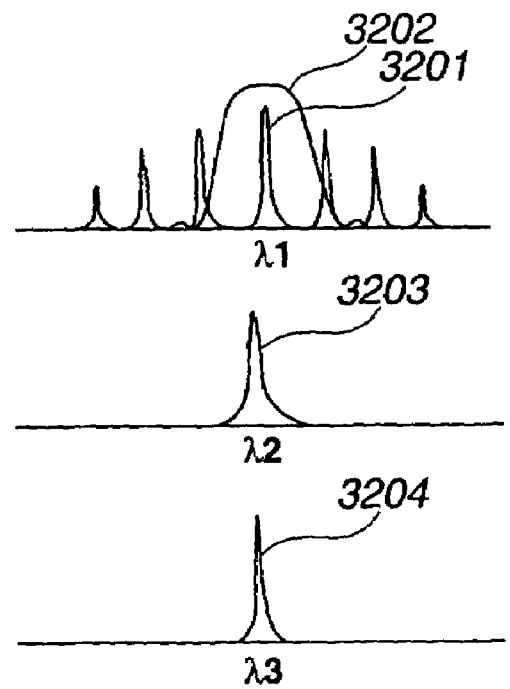
FIG. 3 is a schematic view illustrating an operation principle of the embodiment of the present invention.

FIG. 3 shows the operation principle of the second embodiment. In FIG. 3, reference numeral 3201 represents an external resonator longitudinal mode of the first semiconductor laser 111. Reference numeral 3202 represents a wavelength tolerance width of the first semiconductor laser 111, and effective wavelength conversion occurs in a wavelength range indicated by the wavelength tolerance width 3202. Reference numeral 3203 represents an oscillation spectrum of the second semiconductor laser 117. The sum frequency mixing is effected between light from the first and second semiconductor lasers in the wavelength converting element 113, and sum frequency light 3204 is thus generated. Where $\lambda_1$ (=2 $\pi c/\omega_1$) is the resonator mode wavelength of the first semiconductor laser in connection with generation of the sum frequency light, $\lambda_2$ (=2 $\pi c/\omega_2$) is the oscillation wavelength of the second semiconductor laser, and $\lambda_3$ (=2 $\pi c/\omega_3$) is the wavelength of the sum frequency light generated by the sum frequency mixing, the following relation (1) must be satisfied in the light of the frequency matching condition:

$$\omega_3 = \omega_1 + \omega_2 \quad (1)$$

In the structure of FIG. 2, the wavelength converting element 113 is fabricated by forming the waveguide 2116 after establishing the periodically domain-inverted structure 2115 in the nonlinear optical material. The periodically domain-inverted structure is so designed that phases of three lights can be matched with each other in the wavelength converting element 113. In other words, where $n_1$, $n_2$ and $n_3$ are refractive indices for wavelengths of the first semiconductor laser light, the second semiconductor laser light, and the sum frequency light, respectively, the following relation (2) must be satisfied in the light of the phase matching condition.

$$n_3\omega_3 = n_1\omega_1 + n_2\omega_2 \pm \Delta k \quad (2)$$

The term $\Delta k$ satisfying the quasi-phase matching condition in the relation (2) can be achieved by producing the periodically domain-inverted structure with the period $\hat{}$ written as:

$$\hat{} = 2\pi c/\Delta k \quad (3)$$

When $P_1$ is the input power of the first semiconductor laser light, and $P_2$ is the power of the second semiconductor laser light, the power $P_3$ of the sum frequency light is written as:

$$P_3 = \frac{\omega_3}{\omega_2} P_2 \sin^2\left(\frac{2}{\pi} d_{eff} L \left(2\eta_0^3 \frac{\omega_2 \omega_3 P_1}{n_1 n_2 n_3 A}\right)^{\frac{1}{2}}\right) \quad (4)$$

where $\mu_0$ is the vacuum permeability, $d_{eef}$ is the effective nonlinear constant, L is the length of the crystal, and A is the cross-sectional beam area.

It can be understood from the relation (4) that an increase in the power $P_1$ of the first semiconductor laser light, or a decrease in the area A of the cross section of the waveguide has the same effect on the purpose of increasing the power $P_3$ of the sum frequency light as an increase in the length L of the crystal.

Figure 4:
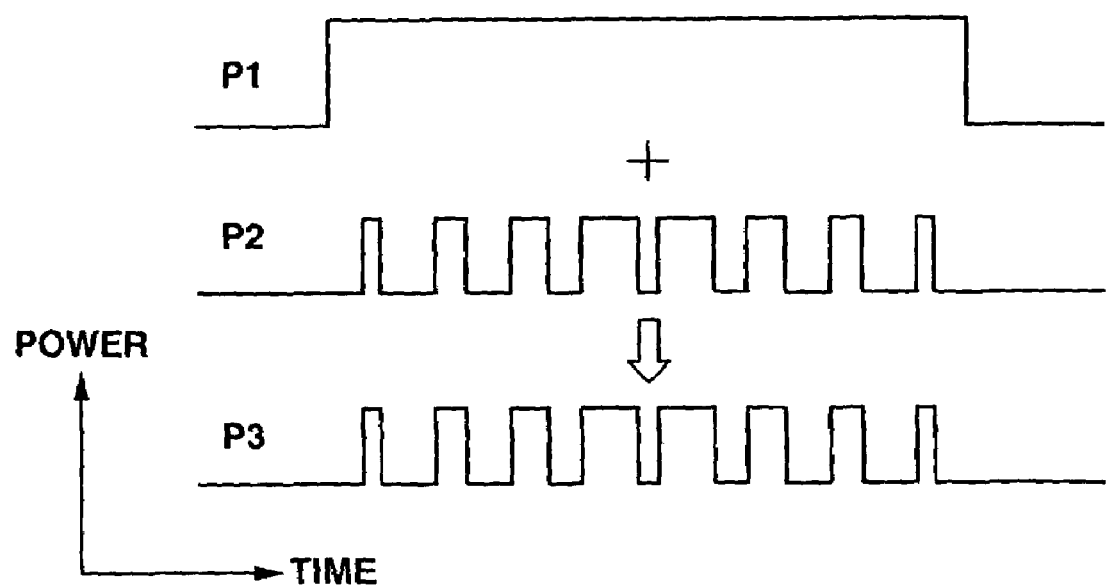
FIG. 4 is a schematic view illustrating an operation principle of the embodiment of the present invention.

The modulated waveform of the sum frequency light in the second embodiment will be described with reference to FIG. 4. FIG. 4 is a graph showing the waveform of power $P_1$ of the first semiconductor laser light which is increased under the resonant condition, the waveform of power $P_2$ of the second semiconductor laser light, and the waveform of power $P_3$ of the sum frequency light obtained by the sum frequency mixing with the abscissa of time. It can be understood from the waveform of power $P_1$ of the first semiconductor laser light that the first semiconductor laser 111 is operated to emit a continuous wave. It is also understood from the waveform of power $P_2$ of the second semiconductor laser light that the second semiconductor laser light is varied with time by the modulation signal supplied from the driving circuit 2110.

As shown in the relation (4), the power $P_3$ of the sum frequency light 119 is proportional to the power $P_2$ of the second semiconductor laser 117, and hence has a modulated waveform similar to that of the second semiconductor laser light. The increase in the density of light power $P_1$ in the wavelength converting element 113 in the external resonator structure contributes to the improvement of the wavelength conversion efficiency as shown in the relation (4). Further, since the second semiconductor laser 117 which is modulated by the modulation signal does not constitute the external resonator, this laser can be subjected to a high-speed modulation. In connection with modulation of a semiconductor laser, carrier fluctuation in its semiconductor active layer increases when a large current is injected into the laser. Further, the laser is difficult to speedily follow a waveform changing with time, when the laser is considered as an electric element. In this respect, when one semiconductor laser light out of input light power of the present invention is made a continuous wave, and only the other semiconductor laser light is subjected to modulation, the amount of modulated driving current can be reduced as a whole. Accordingly, the carrier fluctuation in the semiconductor active layer can also be decreased. The driving electric source can hence be readily designed suitably for high-speed use.

Figure 5:
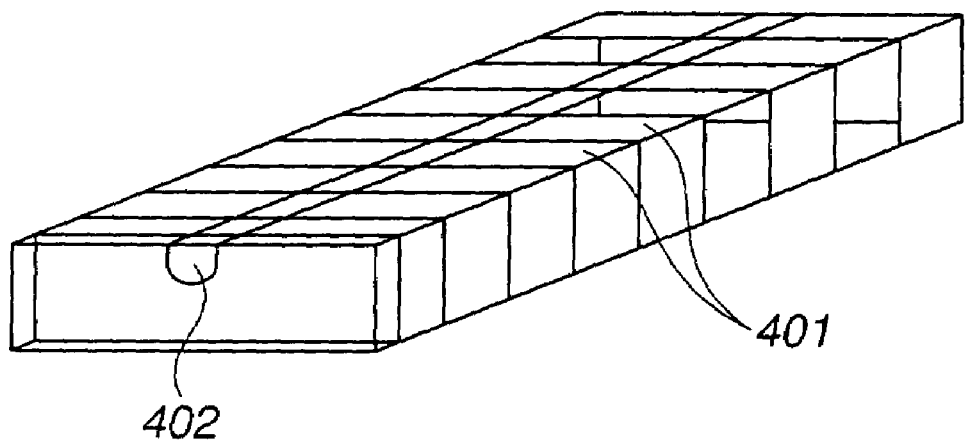
FIG. 5 is a schematic view illustrating a wavelength converting element in the embodiment of the present invention.

The periodically domain-inverted structure of the wavelength converting element in the second embodiment will be described. FIG. 5 is a schematic view illustrating a specific structure of the periodically domain-inverted structure of the wavelength converting element in this embodiment. Reference numeral 402 represents a waveguide. Reference numeral 401 represents a periodically domain-inverted structure. The wavelength converting element is made of a nonlinear optical crystal. This crystal can be KTiOPO$_4$ (KTP) whose crystal length is 10 mm, and which is cut so that the light propagates along the phase matching angle θ (the angle between the propagation direction and the z-axis of the crystal) of 90 degrees, and the phase matching angle φ (the angle between the propagation direction and the x-axis of the in the x-y plane) of 0 degree.

It is preferable to form the periodically domain-inverted structure 401 in the crystal, and achieve the quasi-phase matching such that the sum frequency light can be effectively generated from two semiconductor laser lights. The domain inversion can be obtained by forming a comb-shaped electrode. Further, Rb ions are diffused on the crystal surface through a mask to form the waveguide 402 with its stripe width of about 5 μm. Thus, light confinement is improved.

Two light beams from the first and second semiconductor lasers, whose polarization planes are perpendicular to each other, are input into the waveguide of the thus-fabricated wavelength converting element with the phase matching condition being satisfied. The period of the domain inversion is 29 μm to 30 μm. Under the phase matching condition of KTP, the tolerance width for the oscillation wavelength of the semiconductor laser 111 is wide, say approximately 46 nm. Therefore, most light of the semiconductor laser 111 for enhancing the light power in the external resonator structure can be employed for the wavelength conversion even if its oscillation spectrum is put in a multi-mode. Hence, the conversion efficiency cannot be advantageously decreased. Further, no temperature control mechanism is needed since the temperature tolerance width of the KTP crystal for its crystal length of 10 mm is large, say 70° C. The dielectric multi-layer 2107 of an antireflective dielectric multi-layer made of $TiO_2$ and $SiO_2$ is formed on the end face 2107' of KTP such that no reflection occurs at 805 nm to 810 nm and at 1550 nm to 1590 nm. Furthermore, the dielectric multi-layer 2106 is formed on the end face 2106' of the KTP such that a high reflectance can be achieved at 805 nm to 810 nm while a low reflectance can be achieved at 530 nm to 540 nm.

Figure 6:
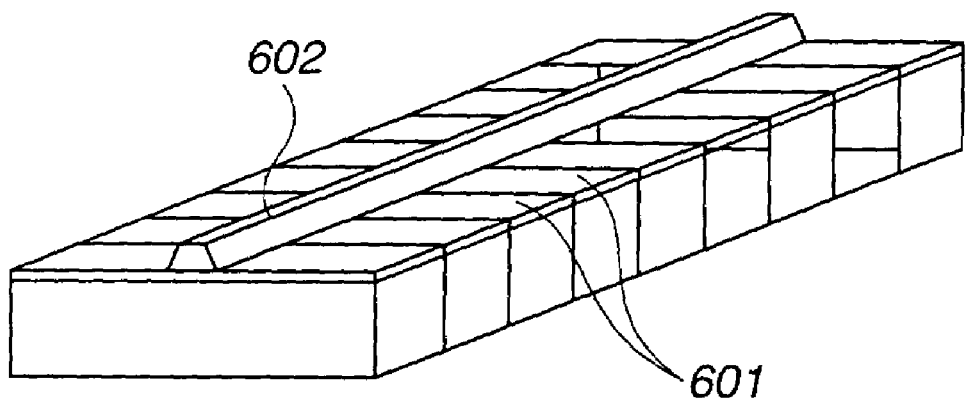
FIG. 6 is a schematic view illustrating another wavelength converting element in the embodiment of the present invention.

FIG. 6 illustrates another periodically domain-inverted structure of the wavelength converting element applicable to this embodiment. In FIG. 6, reference numeral 601 represents a periodically domain-inverted structure. Reference numeral 602 represents a waveguide. In this applicable wavelength converting element, the waveguide is formed projecting from the wavelength converting element, and a ridge structure perpendicular to the periodically domain-inverted structure is thus formed.

In the second embodiment, the first semiconductor laser 111 includes an active layer of a GaAs quantum well structure. When a driving current of 150 mA is supplied to this semiconductor laser, light output of about 150 mW in a single transverse mode can be obtained. Its oscillation wavelength is approximately in a range of 805 nm to 810 nm. When an appropriately-designed dielectric multi-layer is provided on each end face of this semiconductor laser, the end face 2102' is highly reflective to light at wavelengths of 805 nm to 810 nm while the end face 2103' achieves low reflection to light at wavelengths of 805 nm to 810 nm.

Further, the second semiconductor laser 117 is a DFB laser including an active layer of an InGaAsP quantum well structure. When a driving current of 150 mA is supplied to this semiconductor laser, light output of about 40 mW in a single longitudinal mode and in a single transverse mode can be obtained. Its oscillation wavelength is approximately in a range of 805 nm to 810 nm. In the DFB laser, a stable oscillation wavelength can be obtained due to presence of a diffraction grating structure formed in its guide layer above the laser active layer.

In the thus-fabricated optical wavelength converting apparatus, a constant current is supplied to the first semiconductor laser 111, and a pulse current at repeated frequency of 500 MHz is supplied to the second semiconductor laser 117. As the result thereof, the sum frequency light output at the wavelength of 530 nm to 540 nm with a power of about several mW can be obtained. The sum frequency light pulse has a waveform approximately similar to the modulation waveform of the second semiconductor laser 117. The semiconductor laser light transmitting through the KTP is absorbed, or reflected by an infrared cut filter (not shown). Only modulated green laser light with its central wavelength of 530 nm to 540 can thus be obtained.

In the second embodiment, the periodical domain inversion is provided in the nonlinear optical material to achieve the quasi-phase matching. However, angular phase matching requiring no periodical domain inversion can be achieved, when wavelengths of the first and second semiconductor laser light are set at 808 nm and 1550 nm, respectively, and the propagation angles in the nonlinear optical material are set as $\theta=59.6°$ and $\phi=0°$. In such a case, the periodically domain-inverted structure 2115 as illustrated in FIG. 2 is not needed. Further, a bulk nonlinear optical material lacking the waveguide 2116 can be employed. In such a case, the optical system in the external resonator only needs to be designed such that the diameter of a laser beam can be thinned in the nonlinear optical material.

A third embodiment will be described. An optical wavelength converting apparatus of the third embodiment has a feature in that a reflective face of a pair of reflective faces on the side of the wavelength converting element is a mirror disposed away from the wavelength converting element. The third embodiment is the same as the second embodiment in other points.

Figure 7:
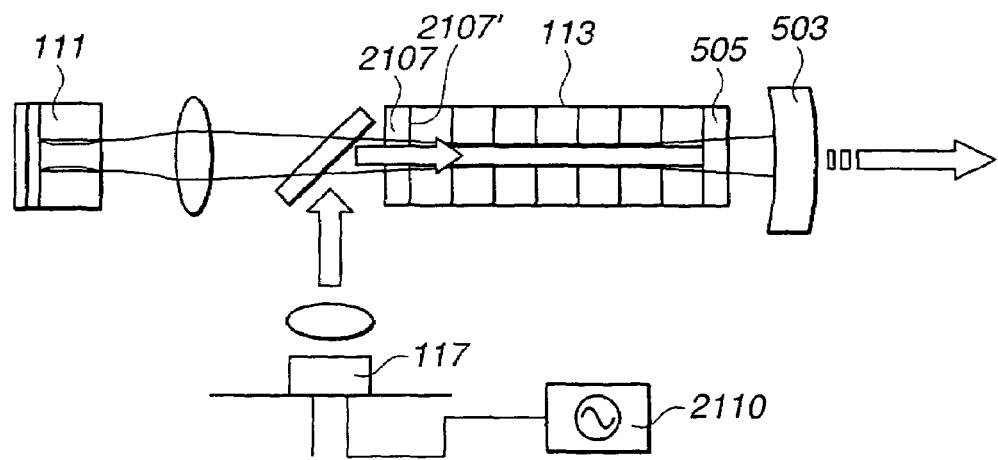
FIG. 7 is a schematic view illustrating another embodiment of an optical wavelength converting apparatus according to the present invention.

FIG. 7 illustrates the optical wavelength converting apparatus of the third embodiment. In FIG. 7, reference numeral 503 represents a mirror. The mirror 503 is arranged away from the wavelength converting element 113. Reference numeral 505 represents a dielectric multi-layer. The mirror 503 is preferably a concave mirror for light emerging from the wavelength converting element 113. In such a structure, even when light from the wavelength converting element 113 is thick or divergent, the light can be thinned and returned to the wavelength converting element by reflection at the concave mirror 503. Where the mirror 503 has a curved surface concave against the wavelength converting element 113, the waveguide can be omitted in the wavelength converting element.

The dielectric multi-layer 505 is disposed at the end portion of the wavelength converting element according to necessity. The dielectric multi-layer 505 is antireflective to light from the first semiconductor laser 111.

In more detail, the wavelength converting element 113 is made of KTP, and the phase matching angles $\theta=90°$ and $\phi=0°$ are the same as the second embodiment. On the other hand, polarization orientations of two semiconductor laser light for achieving the phase matching condition are common to each other. The period of the periodically domain-inverted structure is about 10 µm. Films coated on end faces are the same as those in the second embodiment. The phase matching of such KTP is non-critical for $\theta=90°$ and $\phi=0°$, and the angular tolerance width for the wavelength conversion efficiency can be increased. Further, the nonlinear constant can be designed at the maximum nonlinear tensor component $d_{33}=16.9$ (pm/V) of the KTP crystal.

A fourth embodiment will be described. An optical wavelength converting apparatus of the fourth embodiment has a feature in that an electrode-divided DBR laser is used as the second semiconductor laser. The fourth embodiment is the same as the second or third embodiment in other points.

Figure 8:
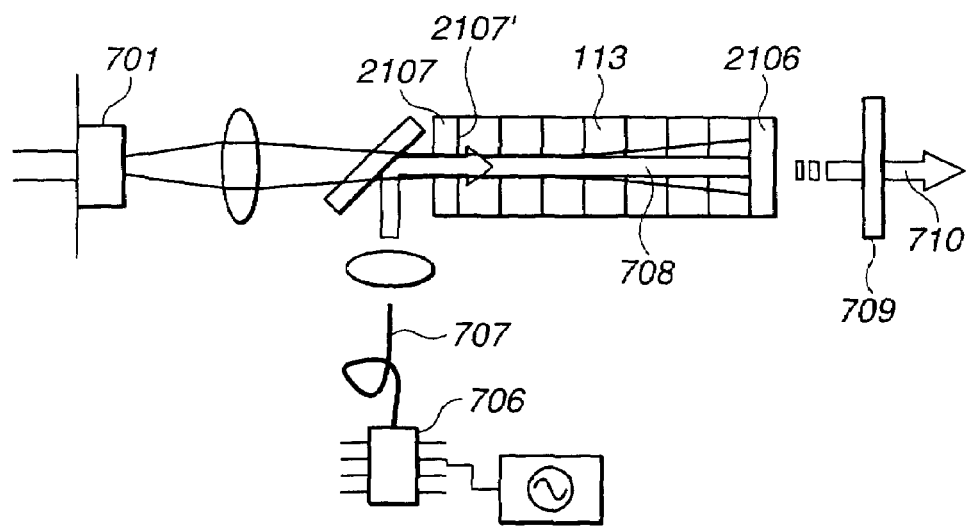
FIG. 8 is a schematic view illustrating another embodiment of an optical wavelength converting apparatus according to the present invention.

FIG. 8 illustrates the optical wavelength converting apparatus of the fourth embodiment. In FIG. 8, reference numeral 706 represents a DBR laser. Reference numeral 707 represents an optical fiber provided according to necessity. Reference numeral 701 represents a first semiconductor laser whose light emitting end face is coated with an antireflective coating, and which is can-packaged. Reference numeral 708 represents a waveguide. Reference numeral 709 represents an infrared cut filter provided according to necessity.

In this embodiment, since the electrode-divided DBR laser is used as the second semiconductor laser, its oscillation wavelength can be readily controlled. Three electrodes of the electrode-divided DBR laser are separately formed on a DBR region, a gain region, and a phase region, respectively. Its oscillation wavelength and optical output can be simultaneously controlled by controlling the amount of current supplied to each region. The optical fiber 707 can be provided as occasion demands, but when an optical fiber is provided integrally with the second semiconductor laser, this optical fiber can be used.

In the fourth embodiment, $LiNbO_3$ (LN) is used as the wavelength converting element 113. Periodically domain-inverted structure and waveguide are formed in the wavelength converting element 113 similarly to the structure of FIG. 5 such that the sum frequency light can be effectively generated from light at oscillation wavelengths of the two semiconductor lasers 701 and 706. A grating-shaped electrode with a period of about 7 μm to 8 μm is formed on the z-cut LN substrate such that the periodically domain-inverted structure can be formed by applying a large electric field to this electrode. Further, the waveguide 708 with a width of 5 μm and a depth of 5 μm is formed by proton exchange along a direction perpendicular to the domain inversion grating. The effect of enhancing the power density in the nonlinear optical material of the wavelength converting element is described in the relation (4). This effect can be drastically enhanced by forming the waveguide in the nonlinear optical material. The waveguide length is set at 10 mm, and two semiconductor laser light is coupled to the wavelength converting element with their polarization planes being made parallel to the substrate.

In the wavelength converting element using the quasi-phase matching of the LN crystal, wavelength tolerance widths for the semiconductor laser 701 and the semiconductor laser 706 are narrow, say about 0.8 nm and 0.3 nm, respectively. The wavelength conversion efficiency of the sum frequency light, however, can be adjusted to be maximum by variably controlling the oscillation wavelength by changing current injected into the DBR region and the phase control region of the semiconductor laser 706. Light output of the semiconductor laser 706 can be varied by controlling current injected into the gain region. The modulation signal is superimposed on the current injected into the gain region. High wavelength conversion efficiency can be obtained in this embodiment since the maximum nonlinear tensor component $d_{33}=34.4$ (pm/V) of the LN crystal can be used, though the wavelength tolerance width is narrow. The semiconductor laser light transmitting through the waveguide 708 is treated by the infrared cut filter 709, and changes to green laser light 710 which is a component the sum frequency light.

A fifth embodiment will be described. An optical wavelength converting apparatus of the fifth embodiment has a feature in that pulse currents corresponding to a signal and bias current superimposed thereon are supplied to the second semiconductor laser to output pulse-shaped laser light. The fifth embodiment is the same as the second, third, or fourth embodiment in other points.

In the first semiconductor laser, InGaAsP layers are provided on a GaAs substrate as cladding layers on p-side and n-side, and its active layer is comprised of a strained quantum well structure including InGaAs well layer and GaAsP barrier layer. Compressive strain is introduced into the InGaAs well layer, and it is hence possible to emit light in a wavelength range between about 960 nm and about 1000 nm. The second semiconductor laser includes an InGaAsP active layer, and emits light in a wavelength range between 1460 nm and 1500 nm. The sum frequency light in a wavelength range between 570 nm and 600 nm can hence be obtained. In other words, laser light in a range from yellow color to orange color can be flexibly set, and obtained.

In the wavelength converting element of this embodiment, the periodically domain-inverted structure is formed on an LN substrate, and the waveguide is formed. Pulse-shaped laser light output can be obtained when pulse current corresponding to a signal is superimposed on bias current below threshold current which is beforehand supplied to the second semiconductor laser from the driving electric source. In synchronization therewith, pulse light at the sum frequency wavelength can be obtained through the wavelength converting element. When pulse width or pulse peak value of the modulation signal is changed, the sum frequency light undergoes pulse width modulation or pulse amplitude modulation. Thus, a compact laser source, which can emit light in a range between yellow color and orange color and can be modulated, can be obtained. Where the InGaAs-group active layer of the first semiconductor laser is replaced by a GaInNaAs-group or GaAsSb-group active layer, laser light in a slightly longer wavelength range can be obtained. Accordingly, modulated sum frequency light in a range between orange color and red color can be obtained.

In the second to fifth embodiments, the second semiconductor laser light is introduced into the wavelength converting element through a place between the first semiconductor laser and the wavelength converting element. In optical wavelength converting apparatuses of the following embodiments, the second semiconductor laser is arranged such that the second semiconductor laser light is input into the wavelength converting element at a place on a side opposite to the side on which the first semiconductor laser is disposed.

A sixth embodiment will be described. An optical wavelength converting apparatus of the sixth embodiment has a feature in that the second semiconductor laser is arranged such that the second semiconductor laser light is input into the wavelength converting element at a place on a side opposite to the side on which the first semiconductor laser is disposed. The sixth embodiment is the same as any one of the first to fifth embodiments in other points.

Figure 9:
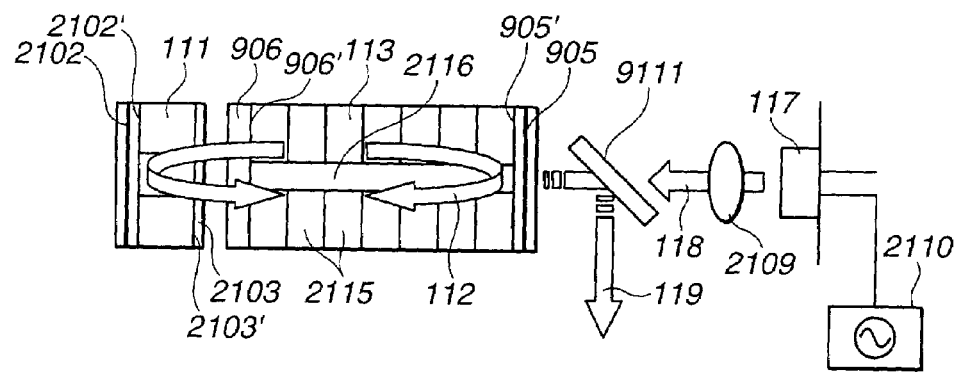
FIG. 9 is a schematic view illustrating another embodiment of an optical wavelength converting apparatus according to the present invention.

FIG. 9 illustrates the optical wavelength converting apparatus of the sixth embodiment. In FIG. 9, reference numerals 905, 905', 906 and 906' represent a dielectric multi-layer for reflecting the first semiconductor laser light, an end portion of the wavelength converting element on the side on which the sum frequency light emits, a dielectric multi-layer for transmitting the first semiconductor laser light therethrough, and an end portion of the wavelength converting element on the side of the first semiconductor laser, respectively. Reference numeral 9111 represents a beam splitter.

The second semiconductor laser 117 is disposed on the side of the wavelength converting element from which the sum frequency light emerges. Light 118 from the second semiconductor laser enters the wavelength converting element 113 through the beam splitter 9111. The sum frequency light emits from the same side of the wavelength converting element, is reflected by the beam splitter 9111, and emerges from the optical wavelength converting apparatus along a direction different from the direction of the second semiconductor laser light 118. In this embodiment, a pair of reflective surfaces are comprised of the dielectric multi-layer 2102 which is a mirror provided on the end portion 2102' of the first semiconductor laser 111, and the dielectric multi-layer 905 for reflecting the first semiconductor laser light 112.

Further, the second semiconductor laser light 118 transmits through the dielectric multi-layer 905. The dielectric multi-layer 905 also permits the sum frequency light 119 to transmit therethrough. The dielectric multi-layer 906 reflects the sum frequency light 119.

Figure 10:
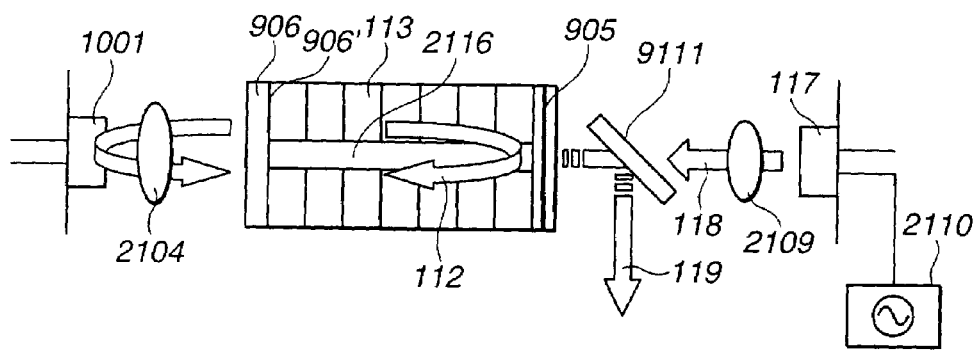
FIG. 10 is a schematic view illustrating another embodiment of an optical wavelength converting apparatus according to the present invention.

FIG. 10 illustrates the optical wavelength converting apparatus of a modification of the sixth embodiment. In FIG. 10, reference numeral 1001 represents a first semiconductor laser. This first semiconductor laser differs from the above first semiconductor laser in that its end face on the light emitting side is coated with the antireflective coating, and it is can-packaged.

A seventh embodiment will be described. An optical wavelength converting apparatus of the seventh embodiment has a feature in that a reflective face of a pair of reflective faces on the side of the wavelength converting element is a mirror disposed away from the wavelength converting element. The seventh embodiment is the same as the sixth or third embodiment in other points.

Figure 11:
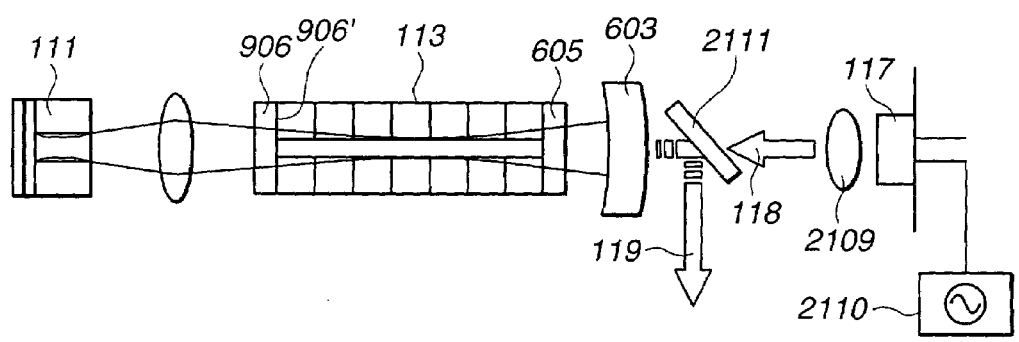
FIG. 11 is a schematic view illustrating another embodiment of an optical wavelength converting apparatus according to the present invention.

FIG. 11 illustrates the optical wavelength converting apparatus of the seventh embodiment. In FIG. 11, reference numeral 603 represents a mirror. Reference numeral 605 represents a dielectric multi-layer. The first semiconductor laser light transmits through the dielectric multi-layer 605 formed on the end face of the wavelength converting element 113 on its light emitting side, and is reflected by the mirror 603 arranged outside the wavelength converting element 113. The resonator is thus constructed. Light from the second semiconductor laser 117 transmits through the beam splitter 2111 and the mirror 603, and enters the wavelength converting element 113.

An eighth embodiment will be described. An optical wavelength converting apparatus of the eighth embodiment has a feature in that an electrode-divided DBR laser is used as the second semiconductor laser. The eighth embodiment is the same as the sixth or fourth embodiment in other points.

Figure 12:
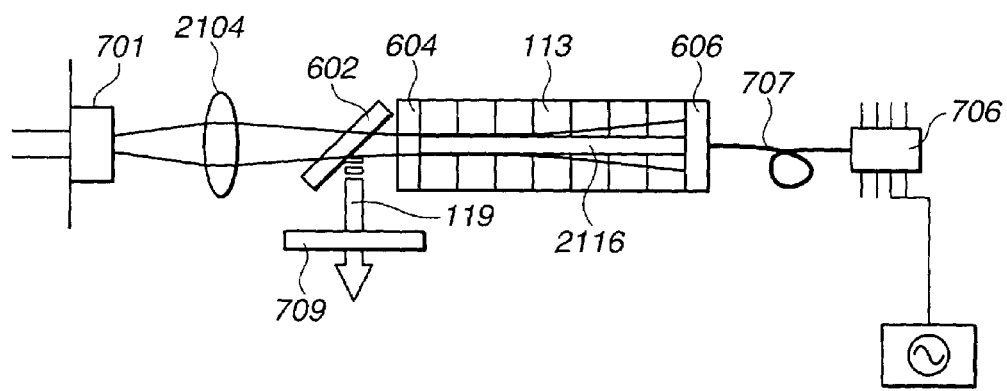
FIG. 12 is a schematic view illustrating another embodiment of an optical wavelength converting apparatus according to the present invention.

FIG. 12 illustrates the optical wavelength converting apparatus of the eighth embodiment. In FIG. 12, reference numerals 604 and 606 represent dielectric multi-layers, respectively. Reference numeral 2116 represents a waveguide. Reference numeral 602 represents a beam splitter. The electrode-divided DBR laser is disposed such that light therefrom enters the wavelength converting element form a side opposite to the side on which the first semiconductor laser 701 is disposed. The dielectric multi-layer 604 permits the first semiconductor laser light, the second semiconductor laser light, and the sum frequency light to transmit therethrough. The dielectric multi-layer 606 reflects the first semiconductor laser light, and permits the second semiconductor laser light to transmit therethrough.

A ninth embodiment will be described. An optical wavelength converting apparatus of the ninth embodiment has a feature in that pulse current corresponding to a signal and bias current superimposed thereon are supplied to the second semiconductor laser to output pulse-shaped laser light. The ninth embodiment is the same as the sixth or fifth embodiment in other points.

Figure 13:
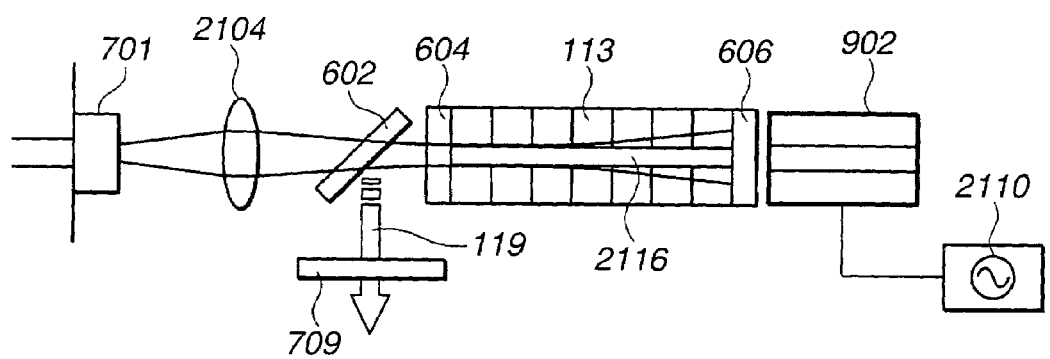
FIG. 13 is a schematic view illustrating another embodiment of an optical wavelength converting apparatus according to the present invention.

FIG. 13 illustrates the optical wavelength converting apparatus of the ninth embodiment. A laser chip 902 having an active layer of a strained quantum well structure, which is the second semiconductor laser, is disposed such that light therefrom enters the wavelength converting element 113 from a side opposite to the side on which the first semiconductor laser 701 is disposed.

Tenth to fifteenth embodiments will hereinafter be described. In those optical wavelength converting apparatuses, the second semiconductor laser is arranged behind the first semiconductor laser.

A tenth embodiment will be described. An optical wavelength converting apparatus of the tenth embodiment has a feature in that the second semiconductor laser is arranged behind the first semiconductor laser. The tenth embodiment is the same as any one of the first to ninth embodiments in other points.

Figure 14:
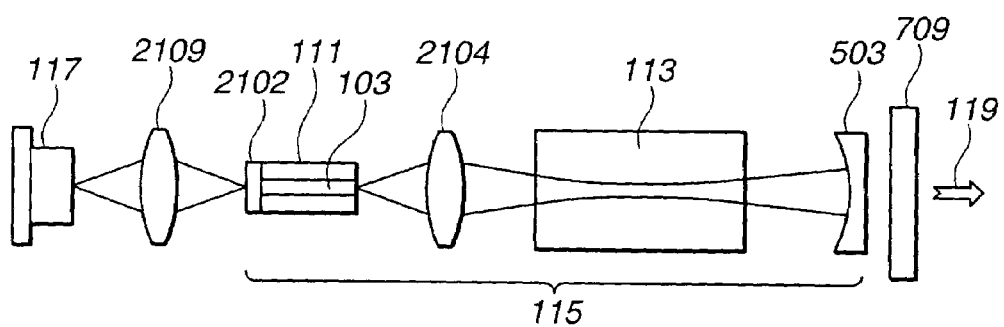
FIG. 14 is a schematic view illustrating another embodiment of an optical wavelength converting apparatus according to the present invention.

FIG. 14 illustrates the optical wavelength converting apparatus of the tenth embodiment. The dielectric multi-layer 2102 and the mirror 503 constitute a pair of reflective faces, and the external resonator structure 115 is constructed by these reflective faces, the first semiconductor laser 111, and the wavelength converting element 113. The second semiconductor laser 117 is arranged behind the first semiconductor laser 111. Light from the second semiconductor laser 117 transmits through the dielectric multi-layer 2102 and the first semiconductor laser 111, and emerges therefrom.

The second semiconductor laser 117 is a DFB laser emitting light at 1550 nm, for example. The waveguide 103 in the first semiconductor laser 111 is made of an AlGaAs/GaAs multi-layer, for example. The wavelength converting element 113 is formed of a KTP crystal of nonlinear optical material, for example. The second semiconductor laser light transmits through the wavelength converting element 113 only once.

An eleventh embodiment will be described. An optical wavelength converting apparatus of the eleventh embodiment has a feature in that there are provided the periodically domain-inverted structure and the waveguide in the wavelength converting element. The eleventh embodiment is the same as the tenth embodiment in other points.

Figure 15:
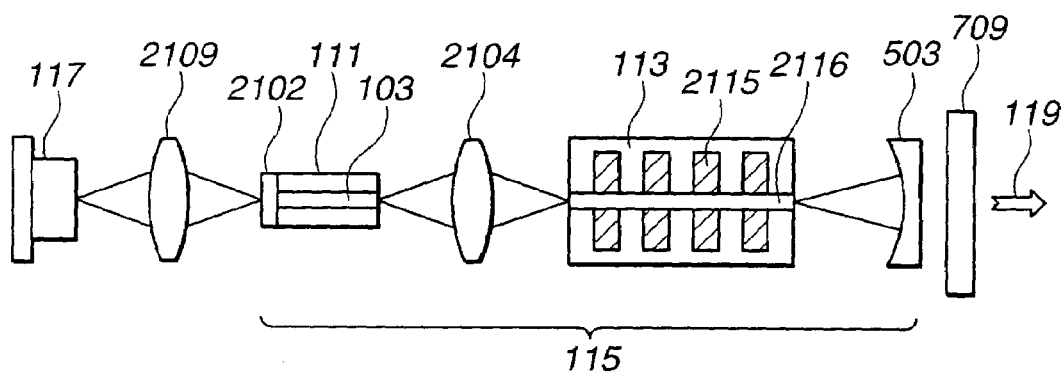
FIG. 15 is a schematic view illustrating another embodiment of an optical wavelength converting apparatus according to the present invention.

FIG. 15 illustrates the optical wavelength converting apparatus of the eleventh embodiment. In this embodiment, the waveguide 2116 is formed by, for example, soaking a crystal in fused $RbNO_3$ to diffuse Rb in the crystal. The KTP crystal has a thickness of 1 mm, and is z-cut. Its length is 10 mm. The waveguide 2116 extends parallel to the x-direction, and the period of the periodically domain-inverted structure is set at 10 μm considering the phase matching condition of the sum frequency conversion. The extension direction of the waveguide 2116 is so selected that the effective nonlinear optical constant can be maximum (i.e., the wavelength conversion can be achieved using the maximum nonlinear optical constant component of the crystal). The cross-sectional area of the waveguide 2116 is about 15 μm². Further, there are formed on both opposite end faces of the wavelength converting element 113 multi-layers (not shown) designed to be substantially antireflective to both light at wavelengths of 808 nm and 1550 nm.

Light from the first semiconductor laser 111 is coupled to the waveguide 2116 by the condenser lens 2104, and propagates through the waveguide 2116. Here, the polarization state of the first semiconductor laser light is beforehand controlled so as to transmit through the waveguide 2116 in the TM mode. The polarization state of the second semiconductor laser light also is beforehand controlled so as to transmit through the waveguide 2116 in the TM mode.

A twelfth embodiment will be described. An optical wavelength converting apparatus of the twelfth embodiment has a feature in that the waveguide 103 and the waveguide 2116 are optically coupled using a so-called butt-coupling method (in this method, end faces directly abut each other for coupling), without using the lens. The twelfth embodiment is the same as the eleventh embodiment in other points.

Figure 16:
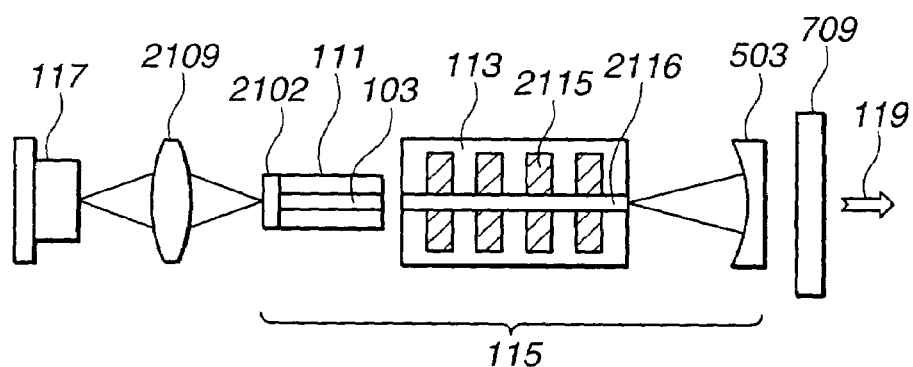
FIG. 16 is a schematic view illustrating another embodiment of an optical wavelength converting apparatus according to the present invention.

FIG. 16 illustrates the optical wavelength converting apparatus of the twelfth embodiment. In this embodiment, the wavelength converting element 113 is formed of a y-cut KTP crystal having a thickness of 1 mm, and the period of the periodically domain-inverted structure is set at 10 μm considering the phase matching condition of the sum frequency conversion. The extension direction of the waveguide 2116 is so selected that the effective nonlinear optical constant can be maximum (i.e., the wavelength conversion can be achieved using the maximum nonlinear optical constant component of the crystal). The cross-sectional area of the waveguide 2116 is about 15 μm². Further, there are formed on both opposite end faces of the wavelength converting element 113 multi-layers (not shown) designed to be substantially antireflective to both light at wavelengths of 808 nm and 1550 nm.

The waveguides 103 and 2116 are adjacently disposed about several microns away from each other. Here, the oscillation polarization state of the first semiconductor laser light is in the TE mode, and this light transmits through the waveguide 2116 in the TE mode. The polarization state of the second semiconductor laser light also is beforehand controlled so as to transmit through the waveguide 2116 in the TE mode.

This embodiment can be made smaller than the eleventh embodiment. In the twelfth embodiment, the y-cut KTP crystal is used as the wavelength converting element, but this element is not limited to this crystal. For example, a z-cut KTP crystal can also be used. In this case, if it desirable for light to propagate through the waveguide in the KTP crystal in the TM mode, the following constructions are needed, for example. The layer structure of an active layer in the semiconductor laser is designed such that a gain for the TM-mode light increases. Reflectances of the resonator mirror are made polarization-dependent such that laser oscillation occurs in the TM mode.

A thirteenth embodiment will be described. An optical wavelength converting apparatus of the thirteenth embodiment has a feature in that a dielectric multi-layer is provided on one end face of the wavelength converting element without using the mirror provided in the twelfth embodiment. The thirteenth embodiment is the same as the twelfth embodiment in other points.

Figure 17:
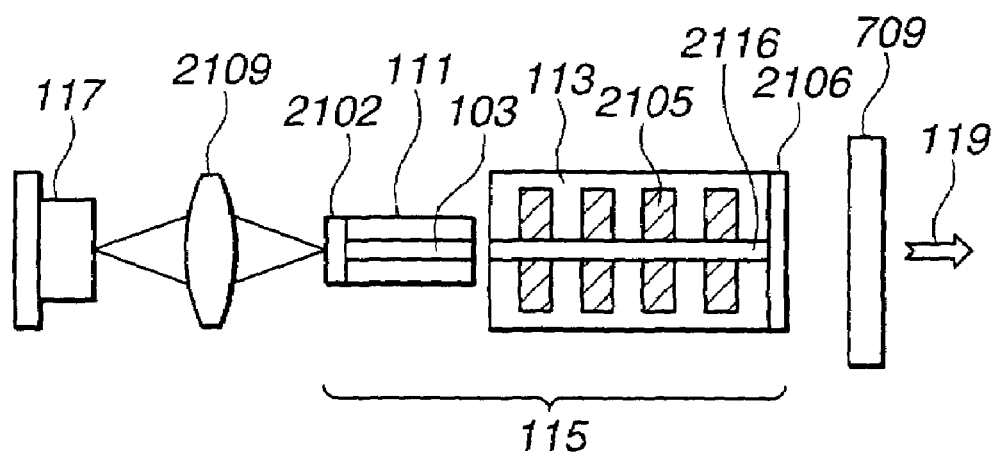
FIG. 17 is a schematic view illustrating another embodiment of an optical wavelength converting apparatus according to the present invention.

FIG. 17 illustrates the optical wavelength converting apparatus of the thirteenth embodiment. In this embodiment, the dielectric multi-layer 2106 is formed directly on one end face of the wavelength converting element 113. The dielectric multi-layer 2106 and the dielectric multi-layer 2102 formed on the end portion of the first semiconductor laser 111 correspond to a pair of reflective faces. This embodiment can be made still smaller than the twelfth embodiment.

A fourteenth embodiment will be described. An optical wavelength converting apparatus of the fourteenth embodiment has a feature in that the first semiconductor laser and the second semiconductor laser are optically coupled using the butt-coupling method (in this method, end faces directly abut each other for coupling), without using the lens. The fourteenth embodiment is the same as the thirteenth embodiment in other points.

Figure 18:
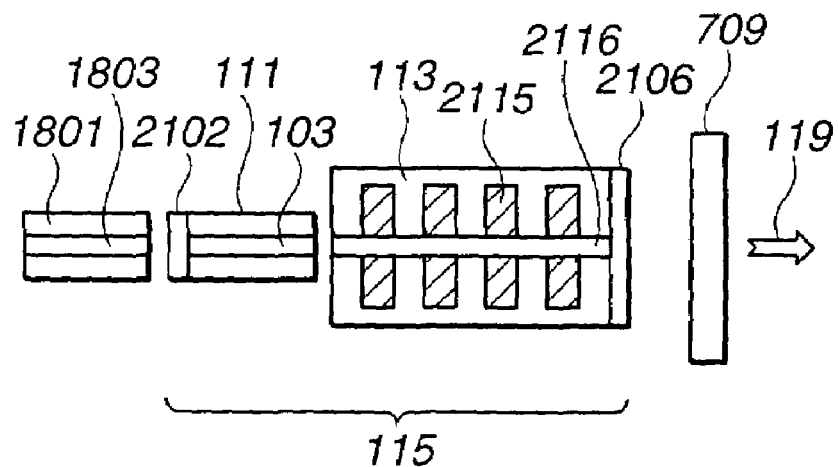
FIG. 18 is a schematic view illustrating another embodiment of an optical wavelength converting apparatus according to the present invention.

FIG. 18 illustrates the optical wavelength converting apparatus of the fourteenth embodiment. Reference numeral 1801 represents a DFB laser of the second semiconductor laser. Reference numeral 1803 represents a waveguide provided in the second semiconductor laser, The waveguides 1803 and 103 are adjacently disposed about several microns away from each other. Here, the oscillation polarization state of the second semiconductor laser light is in the TE mode, and this light transmits through the waveguides 103 and 2116 in the TE mode. The polarization state of the second semiconductor laser light also is beforehand controlled so as to transmit through the waveguide 2116 in the TE mode. This embodiment can be made still smaller than the thirteenth embodiment.

A fifteenth embodiment will be described. An optical wavelength converting apparatus of the fifteenth embodiment has a feature in that light from the second semiconductor laser is guided into the first semiconductor laser by an optical fiber. The fifteenth embodiment is the same as the fourteenth embodiment in other points.

Figure 19:
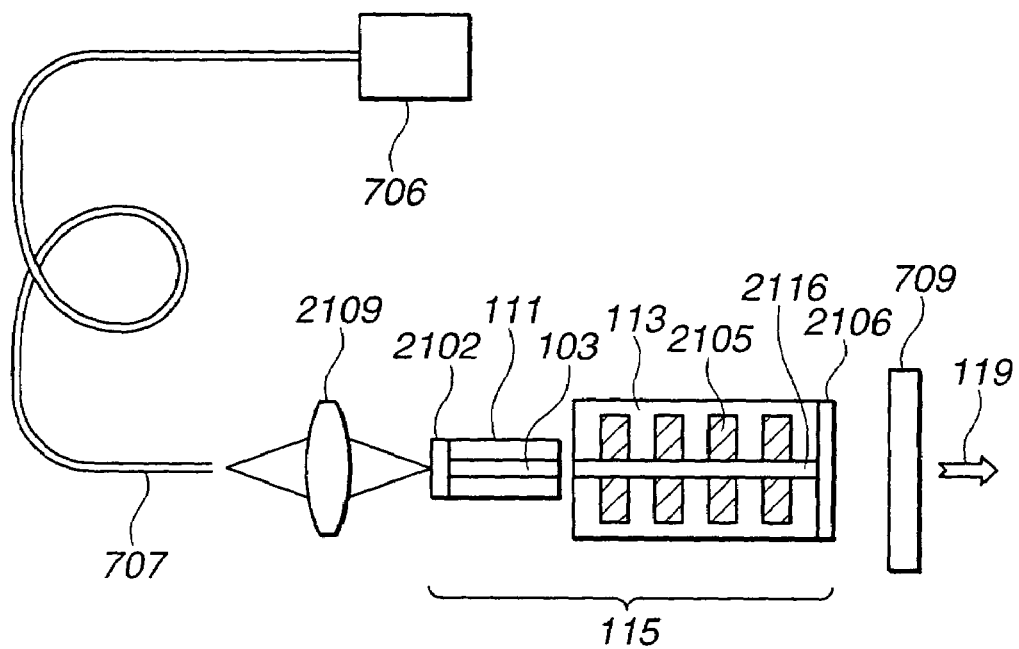
FIG. 19 is a schematic view illustrating another embodiment of an optical wavelength converting apparatus according to the present invention.

FIG. 19 illustrates the optical wavelength converting apparatus of the fifteenth embodiment. Reference numeral 706 represents a second semiconductor laser. Reference numeral 707 represents an optical fiber. The second semiconductor laser 706 is comprised of a DFB semiconductor laser with which the optical fiber 707 is integrally provided beforehand.

In the optical wavelength converting apparatus of this embodiment, the second semiconductor laser can be disposed at a location remote from the external resonator structure 115. In the structure of FIG. 19, the condenser lens 2109 is used. The light emitting end of the optical fiber 707, however, can be brought into a place close to the first semiconductor laser 111 to couple thereto without using the condenser lens 2109. Further, a lensed optical fiber with a spherically-formed light emitting end can be used.

A sixteenth embodiment will be described. A picture projection type display apparatus of the sixteenth embodiment has a feature in that the optical wavelength converting apparatus of any one of the first to fifteenth embodiments is used as a light source.

Figure 20:
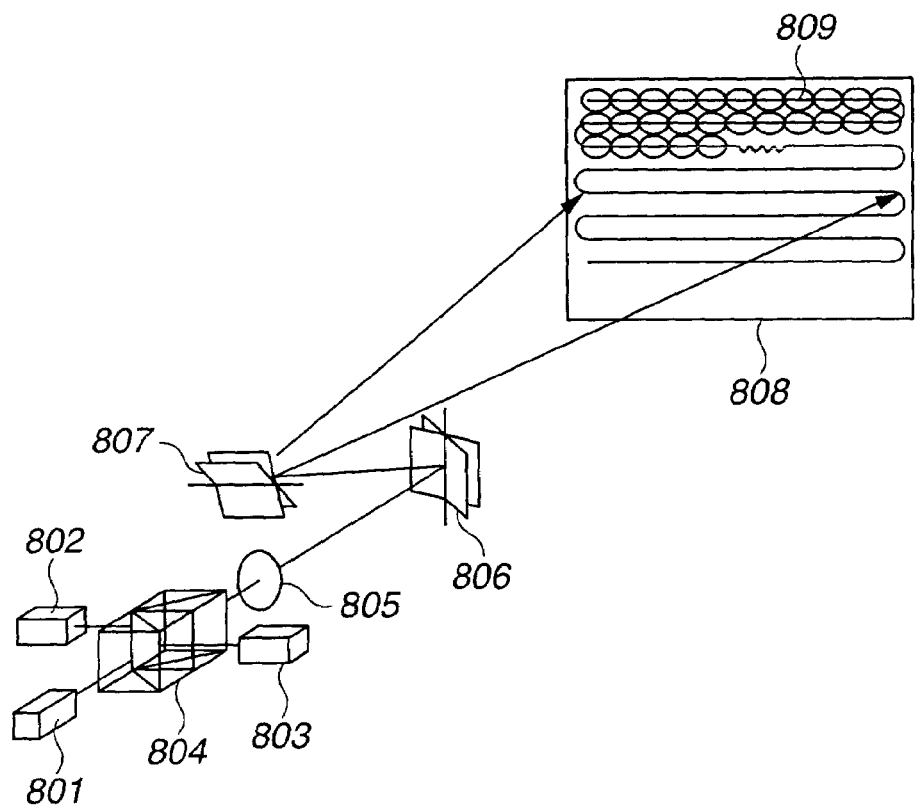
FIG. 20 is a schematic view illustrating an embodiment of a picture projection type display apparatus which includes an optical wavelength converting apparatus of the present invention.

FIG. 20 illustrates the picture projection type display apparatus of the sixteenth embodiment. Reference numerals 801, 802 and 803 represent light sources, respectively. Reference numeral 804 represents a multiplexer. Reference numeral 805 represents a projecting lens. Reference numerals 806 and 807 represent optical deflectors, respectively. Reference numeral 808 represents a projection plane or screen. Reference numeral 809 represents a pixel spot. Light sources 801, 802 and 803 emit light of different colors, respectively. These colors are red, green and blue, for example. A full-color picture display apparatus can be provided using those light sources of different colors. The optical wavelength converting apparatus of the present invention can be used as the green light source 802, for example.

The multiplexer 804 serves as a means for multiplexing light from the respective light sources 801, 802 and 803. Multiplexed light emerging from the multiplexer 804 transmits through the projecting lens 805. Light from the projecting lens 805 is initially reflected by the optical deflector 806. The reflected light is then reflected by another deflector 807, and projected on the projection plane 808. The multiplexed light contains picture information corresponding to each pixel on the projection plane 809.

In this embodiment, the optical deflector 806 is a means for deflecting and scanning light in a horizontal direction (i.e., a scanning direction) on the projection plane 808. Specifically, this is a deflector which is capable of resonant vibration, such as a galvanomirror. The optical deflector 806 has a structure which is fabricated by subjecting semiconductor single crystal material, such as silicon single crystal, to fine working using photolithography techniques, for example. This structure is advantageous in that accurate resonant motion can be achieved. The deflector 806 can be a means for scanning light with picture information only in a single direction, or a means for reciprocatorily scanning light with picture information along the scanning direction. In the latter case, reciprocatory picture forming is possible.

The optical deflector 807 is a means for scanning light in a vertical direction (i.e., a direction perpendicular to the scanning direction) on the projection plane 808. Light with picture information is projected on the projection plane 808 in a two-dimensional manner by the optical deflector 807. A two-dimensional picture is thus displayed on the projection plane.

The optical deflector 807 can be either a resonance type, or a non-resonance type. The reason therefore is that the resonance type is significantly preferable for an optical deflector for scanning light in the scanning direction to achieve a stable and fast motion, while the motion in the vertical direction does not necessarily require a high speed that is required to be achieved for the resonance type. Naturally, both the optical deflectors 806 and 807 can be resonance types.

Description will be made in more detail. In the light source 802 which is a green sum frequency light source apparatus according to the optical wavelength converting apparatus of the present invention, semiconductor lasers at wavelengths of 805 nm and 1590 nm are used as input light sources, and the KTP crystal substrate with the periodically domain-inverted structure and the waveguide is used as the wavelength converting element. Light at 534 nm can hence be obtained. Maximum outputs of the semiconductor lasers at 805 nm and 1590 nm are set at 500 mW and 100 mW, respectively, to obtain the maximum green light output of 100 mW. When continuous current is supplied to the first semiconductor laser, laser resonance at the oscillation wavelength of 805 nm occurs in the external resonator. When modulated current of pulse width modulation is supplied to the second semiconductor laser, laser light at the oscillation wavelength of 1590 nm can be obtained with the peak output of 100 mW.

When light output from the second semiconductor laser is introduced into the wavelength converting element using the beam splitter arranged between the first semiconductor laser and the wavelength converting element, a waveform of the sum frequency light output changing with time in accordance with the light pulse waveform of the second semiconductor laser can be obtained as illustrated in FIG. 4. The pulse width is thus modulated, and the intensity of green light for each pixel can be controlled. Where the projection type picture display apparatus illustrated in FIG. 20 uses SVGA picture (800×600 pixels) and frame rate of 60 Hz, the clock period of about 35 nsec is required. Response characteristic of about 1 nsec or less is required to obtain a sufficient pulse width modulation within the clock period. In this embodiment, it is possible to achieve both sufficient light intensity and high-speed response.

In the blue light source apparatus, an InGaAlP-group semiconductor laser with its oscillation wavelength at the order of 600 nm is used as the first semiconductor laser, and an InGaAsP-group semiconductor laser with its oscillation wavelength at the order of 1500 nm is used as the second semiconductor laser The sum frequency light output can hence be obtained. The maximum output light intensity of blue color is 80 mW, and a high-speed response can be obtained like the case of green light. An InGaN-group semiconductor laser can also be used as the blue light source such that laser light output at about 440 nm to 460 nm can be directly obtained.

In the red light source apparatus, an InGaAlP-group semiconductor laser can be used to directly obtain light at 635 nm. Its maximum output light intensity is 100 mW.

Under the above-discussed conditions, output light from three (blue, green and red) light sources 801, 802 and 803 is multiplexed in the multiplexer 804 made of the dielectric multi-layer. The multiplexed light transmits through the projecting lens 805, and enters the optical deflectors 806 and 807 comprised of micro resonance mirrors fabricated by processing the Si substrate. The micro resonance mirror can be used for deflection in both horizontal and vertical directions, or only for deflection in the horizontal direction. In the latter case, a structure for vibrating the galvanomirror using a micro motor can be used for deflection in the vertical direction in which a low speed deflection is allowable. Laser light is projected on the projection plane 808 as the pixel spot 809, and the pulse width of laser light is controlled for each color in each pixel spot in accordance with each pixel gradation.

Light from the light source apparatus of respective colors is liable to undergo optical losses in the scanning and projecting optical system including the optical deflector. Further, portions nonlinearly scanned by the optical deflector are removed on outermost portions of the screen. Therefore, optical use efficiency is 25% to 50% in the entire picture display apparatus. For example, where the optical use efficiency is 50%, maximum intensities of green laser light, red laser light and blue laser light projected on the screen are 50 mW, 50 mW and 40 mW, respectively. Central wavelength and output light intensity of each color is set such that white color of the standard illuminant $D_{65}$ can be obtained when all color light is turned on.

A seventeenth embodiment will be described. An electrophotographic image forming apparatus of the seventeenth embodiment has a feature in that the optical wavelength converting apparatus of any one of the first to fifteenth embodiments is used as a light source.

Figure 21:
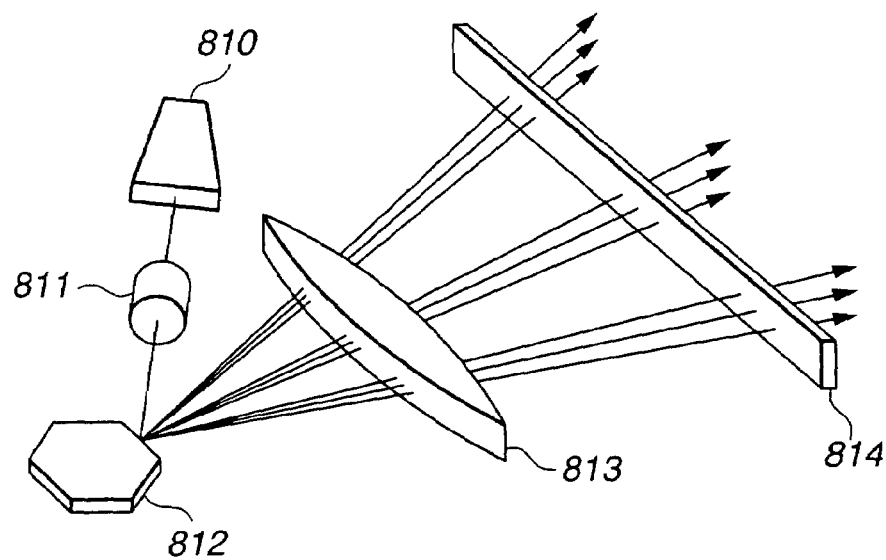
FIG. 21 is a schematic view illustrating an embodiment of an electrophotographic image forming apparatus which includes an optical wavelength converting apparatus of the present invention.
Figure 22:
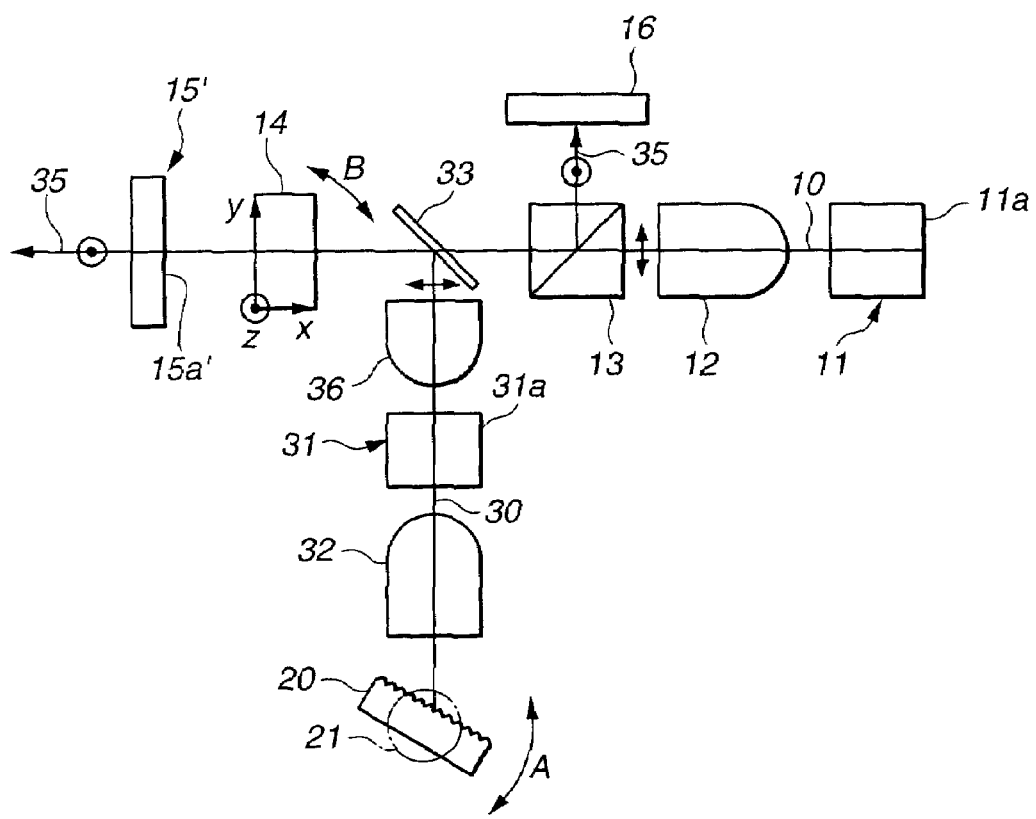
FIG. 22 is a schematic view illustrating a conventional optical wavelength converting apparatus.

FIG. 21 illustrates the image forming apparatus of the seventeenth embodiment. Reference numeral 810 represents an optical wavelength converting apparatus of the present invention. Reference numeral 811 represents a collimator lens. Reference numeral 812 represents an optical deflector. Reference numeral 813 represents a scanning lens. Reference numeral 814 represents a projection plane (an image forming plane). Light from the optical wavelength converting apparatus 810 transmits through the collimator lens 811, and is projected on the optical deflector 812. The optical deflector 812 in this embodiment is a polygon mirror. When the optical deflector 812 rotates, light incident thereon is deflected and scanned in the scanning direction. Light reflected (deflected) by the optical deflector 812 transmits through the scanning lens 813. Light from the scanning lens 813 is projected on the image forming plane. This light contains image information corresponding to each light-projected pixel position arranged with equal interval on the image forming plane. The image forming plane is, for example, a photosensitive body that can generate an electrostatic latent image due to light illumination.

The electrostatic latent image formed on the image forming plane can be transferred as a real image on, for example, a paper by a transferring apparatus (not shown) or the like. Such a structure can be applied to a laser beam printer, a copying machine, etc.

In this embodiment, the polygon mirror is used as the optical deflector. However, a resonance type optical deflector, such as a galvanomirror, and the like can be used in place of the polygon mirror. Scanning by the resonance type optical deflector is discussed in the sixteenth embodiment.

As described in the above embodiments, according to the present invention, there can be provided an optical wavelength converting apparatus and an optical wavelength converting method which are capable of high-speed modulation, and have high conversion efficiency. In other words, the power density of one laser light in the nonlinear optical material can be increased by the resonator structure such that high conversion efficiency can be achieved, and high-speed modulation can be achieved by direct modulation of the other laser light.

While the present invention has been described with respect to what is presently considered to be the preferred embodiments, it is to be understood that the invention is not limited to the disclosed embodiments. The present invention is intended to cover various modifications and equivalent arrangements included within the spirit and the scope of the appended claims.

What is claimed is:

1. An optical wavelength converting apparatus comprising:
   a first semiconductor laser;
   a second semiconductor laser; and
   a wavelength converting element for converting first laser light from said first semiconductor laser and second laser light from said second semiconductor laser to sum frequency light;
   wherein there is provided an external resonator structure inside which said first semiconductor laser and said wavelength converting element are arranged such that the first laser light is put under a resonant condition, and an optical path of the second laser light is so determined that the second laser light can propagate through said wavelength converting element without resonating, to form sum frequency light with the first laser light.

2. An optical wavelength converting apparatus according to claim 1, wherein said second semiconductor laser is arranged such that the second laser light can enter said wavelength converting element through a place between said first semiconductor laser and said wavelength converting element.

3. An optical wavelength converting apparatus according to claim 1, wherein said second semiconductor laser is arranged such that the second laser light can enter said wavelength converting element through a place on a side opposite to a side on which said first semiconductor laser is arranged.

4. An optical wavelength converting apparatus according to claim 1, wherein said second semiconductor laser is arranged such that the second laser light can enter said wavelength converting element through said first semiconductor laser.

5. A picture projection type display apparatus comprising:
a projection body; and
a light source for projecting light on said projection body, said light source including an optical wavelength converting apparatus which includes a first semiconductor laser, a second semiconductor laser, and a wavelength converting element for converting first laser light from said first semiconductor laser and second laser light from said second semiconductor laser to sum frequency light, and in which there is provided an external resonator structure inside which said first semiconductor laser and said wavelength converting element are arranged such that the first laser light is put under a resonant condition, and an optical path of the second laser light is so determined that the second laser light can propagate through said wavelength converting element without resonating, to form sum frequency light with the first laser light.

6. An electrophotographic image forming apparatus comprising:
a projection body; and
a light source for projecting light on said projection body, said light source including an optical wavelength converting apparatus which includes a first semiconductor laser, a second semiconductor laser, and a wavelength converting element for converting first laser light from said first semiconductor laser and second laser light from said second semiconductor laser to sum frequency light, and in which there is provided an external resonator structure inside which said first semiconductor laser and said wavelength converting element are arranged such that the first laser light is put under a resonant condition, and an optical path of the second laser light is so determined that the second laser light can propagate through said wavelength converting element without resonating, to form sum frequency light with the first laser light.

7. An optical wavelength converting method comprising the steps of:
generating first laser light from a first semiconductor laser;
generating second laser light from a second semiconductor laser; and
guiding the first laser light and the second laser light to a wavelength converting element to convert the first laser light and the second laser light to sum frequency light;
wherein there is provided an external resonator structure inside which the first semiconductor laser and the wavelength converting element are arranged such that the first laser light is put under a resonant condition, and an optical path of the second laser light is so determined that the second laser light can propagate through the wavelength converting element without resonating, to form sum frequency light with the first laser light.

8. An optical wavelength converting method according to claim 7, wherein the second semiconductor laser is arranged such that the second laser light can enter the wavelength converting element through a place between the first semiconductor laser and the wavelength converting element.

9. An optical wavelength converting method according to claim 7, wherein the second semiconductor laser is arranged such that the second laser light can enter the wavelength converting element through a place on a side opposite to a side on which the first semiconductor laser is arranged.

10. An optical wavelength converting method according to claim 7, wherein the second semiconductor laser is arranged such that the second laser light can enter the wavelength converting element through the first semiconductor laser.

* * * * *

UNITED STATES PATENT AND TRADEMARK OFFICE
CERTIFICATE OF CORRECTION

| | |
|---|---|
| PATENT NO. | : 7,039,077 B2 |
| APPLICATION NO. | : 10/620419 |
| DATED | : May 2, 2006 |
| INVENTOR(S) | : Yukio Furukawa et al. |

It is certified that error appears in the above-identified patent and that said Letters Patent is hereby corrected as shown below:

Column 1:

Line 31, "a wavelengths" should read --a wavelength--.

Column 7:

Line 55, "$d_{eef}$" should read --$d_{eff}$--.

Column 9:

Line 56, "540" should read --540 nm--.

Column 13:

Line 23, "form a side" should read --from a side--.

Column 15:

Line 2, "desirable" should read --is desirable--.

Column 16:

Line 48, "reason therefore" should read --reason therefor--.

Signed and Sealed this

Second Day of January, 2007

JON W. DUDAS
*Director of the United States Patent and Trademark Office*